June 24, 1969     A. F. ISRAELSON     3,452,310

TURN-OFF PERMANENT MAGNET

Filed Nov. 14, 1966

INVENTOR
ARLO F. ISRAELSON
BY
Charles L. Lovercheck
atty

United States Patent Office 3,452,310
Patented June 24, 1969

3,452,310
TURN-OFF PERMANENT MAGNET
Arlo F. Israelson, Erie, Pa., assignor to Eriez Manufacturing Company, Erie, Pa., a corporation of Pennsylvania
Filed Nov. 14, 1966, Ser. No. 593,942
Int. Cl. H01f 7/20, 7/04
U.S. Cl. 335—286                7 Claims

ABSTRACT OF THE DISCLOSURE

A magnetic device is disclosed that has a stator made up of permanent magnets supported between two spaced legs. An armature made up of a stack of permanent magnets having a rounded pole piece on each end is supported between the legs of the first mentioned magnet. The legs are rounded out to conform to the shape of the rounded end of the armature, thus the armature may be rotated to a position where the field from the first magnet is short-circuited and it may be rotated to another position where the field for the first magnet is aided by the rotor. Thus, the magnets can be used to lift a ferrous object and, by rotating the armature, it can be caused to release the object.

---

This invention relates to permanent magnets and more particularly to magnets wherein the external magnetic field may be turned on and off.

The invention disclosed herein is a turn-off type permanent magnet that requires no electricity and instead of Alnico magnets uses the less expensive oriented ceramic magnets so arranged as to have deep magnetic fields. In most installations it eliminates the need for the large, expensive electro magnets and power supplies such as are used in magnetic roadsweepers and other electro and combination electro permanent magnets used in many other types of applications, such as magnetic separators or handling where the magnetic strength must be turned off for one reason or another. Since it requires no electricity, it is fail-safe.

An additional novelty of the new turn-off permanent magnet is that its strength is fully adjustable from maximum to practically zero. This can be valuable where it is desirable to adjust the magnetic strength to lift one sheet of steel at a time from a stack or in any application where it is desirable to adjust the strength for any other reason.

A typical magnet circuit and structure would consist of two or more stacks or pieces of oriented ceramic magnet materials sandwiched between steel or iron pole pieces. The configuration of the pole pieces and the magnets is such that one or more of the ceramic magnets has *rounded ends* and may be rotated or counterrotated so that its *ends can be switched* to opposite pole pieces and back again. This switching may be accomplished manually or by mechanical means . . . such as pneumatically, hydraulically, or even electrically, or other.

In operation the magnetic assembly is fully magnetized so that there is one main north and one main south pole with the stacks of magnets (or individual magnets) working in aiding relationship to create the main north and south poles.

To "turn off" the effective magnetic strength in the working area of the main poles, one of the stacks of magnets (or individual magnet) is rotated approximately 180 degrees so that its poles in the new position contact, or nearly contact, the opposite main poles. It will be observed that a completely closed magnetic circuit now exists with alternate north and south poles adjacent each other all around the circuit. This results in almost complete absence of magetic holding power at the working face of the main poles.

When it is desired to turn the magnet on again, the movable magnet may simply be returned to its original position.

The magnetic strength may also be adjusted to any desired degree by stopping the rotation at any appropriate position.

It may be noted that this circuit depends upon the high coercive characteristics of oriented ceramic magnetic material because when the movable magnet is returned to its original position there is a brief, but strong, tendency to demagnetize the magnets. Ceramic magnets can resist this, but Alnico magnets could not.

It is an object of the invention to provide an improved magnet which may have its external field effectively turned on and off.

Another object of the invention is to provide a turn-off magnet which is simple in construction and economical to manufacture and simple and efficient to use.

Another object of the invention is to provide a turn-off magnet wherein two permanent magnet units may be so oriented so that their fields are short-circuited, one through the other, and wherein one of the magnets may be oriented relative to the other so that their fields are forced outward into an external field.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
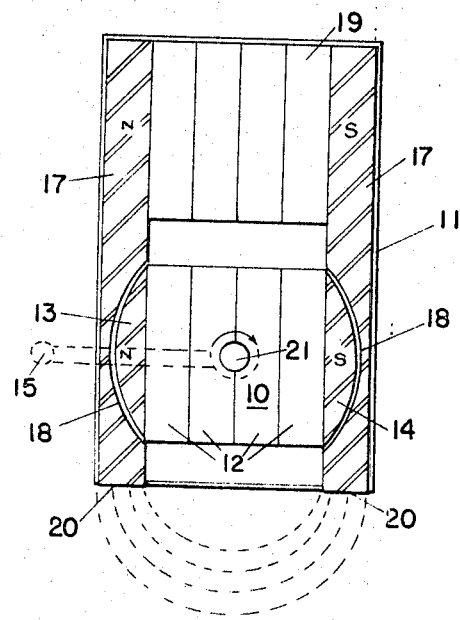
FIG. 1 is a longitudinal cross-sectional view of the device according to the invention showing the magnets oriented to force all of the fields to external position.

Now with more particular reference to the drawing, the magnet device is made up of a stator and an armature supported inside a case 11.

The stator is made up of two spaced legs 17 that may be made up of rectangular iron plates that have the permanent magnet unit 19 sandwiched between them. The legs extend out beyond the magnet unit 19 and have the surfaces 18 formed on their inner side, which conform to the outer periphery of a cylinder and the legs 17 terminate in the lower ends 20 which are spaced from each other. The cylindrical surfaces 18 define a space which receives the armature 10. The armature 10 is made up of the permanent magnet elements 12 which may be rectangular in shape and have the pole pieces 13 and 14, one on each end. The outer surfaces of the pole pieces 13 and 14 are formed in the shape of a cylinder of slightly lesser diameter than the cylinder defined by the surfaces 18. The armature is supported on a shaft 21, which is rotatably supported in bearings 22 in case 11. A crank 15 is attached to the shaft 21 so that it can be rotated. Thus, the permanent magnet unit 19 magnetizes one of the legs north and the other south as shown. The permanent magnet elements making up the magnets 19 and armature magnet 10 may be made of suitable magnetic material; for example, they may be ceramic magnets.

When the armature is in the position shown in FIG. 1, the magnet field developed at the poles of the armature will aid the magnetic field at the poles of the stator legs and thus, the field resulting therefrom will be as illustrated by dotted lines adjacent pole faces 20 as shown in FIG. 1 and the magnet device will attract a magnetic member of any kind to it. The crank 15 may be stopped at any one of an infinite number of positions to adjust or control the magnetic strength from maximum to zero.

When the crank 15 is rotated to move the armature 180 degrees so that the south pole of the armature is adjacent to the north pole of the stator, the field from the stator will be short-circuited through the armature and no external field will result. Thus, the magnet will effectively be turned off.

Figure 2:
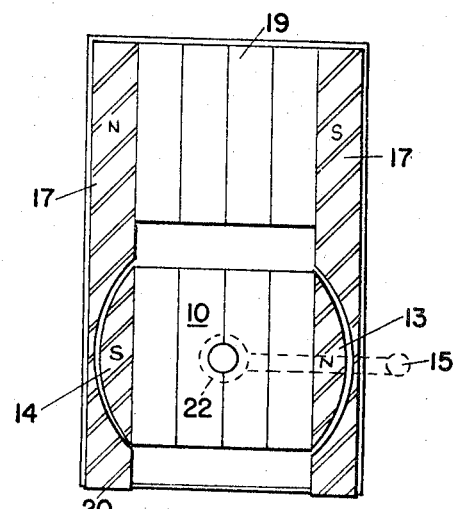
FIG. 2 is a cross-sectional view similar to FIG. 1 with the armature rotated 180 degrees to that shown in FIG. 1 with the magnet in "off" condition.
Figure 3:
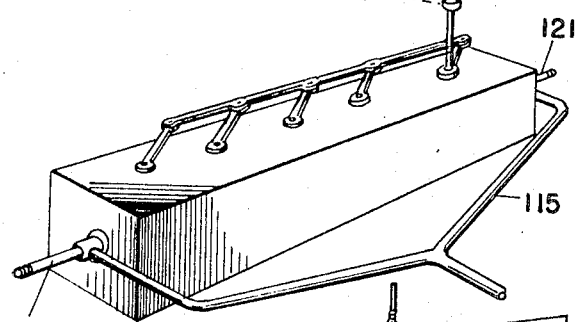
FIG. 3 is an isometric view showing the permanent magnet disclosed herein set up as a sweeper with the usual wheels not shown.

FIG. 3 shows a magnet according to the invention arranged with a tongue 115, which is attached to the shaft 121, in such a way as to pull the device along as a sweeper. The suitable wheels can be placed on the shafts 121. The armatures of multiple magnets can be rotated from one position to the other by means of the crank 116 to turn the magnets on and off in the same manner as in the embodiment of FIGS. 1 and 2.

Figure 4:
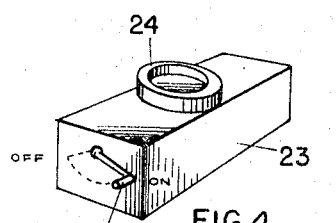
FIG. 4 is a view of the magnet according to the invention used as a magnetic holding device.

FIG. 4 shows a magnet 23 according to the invention wherein parts 24 can be held or released by moving crank 15 to "on" or "off" positions.

Figure 5:
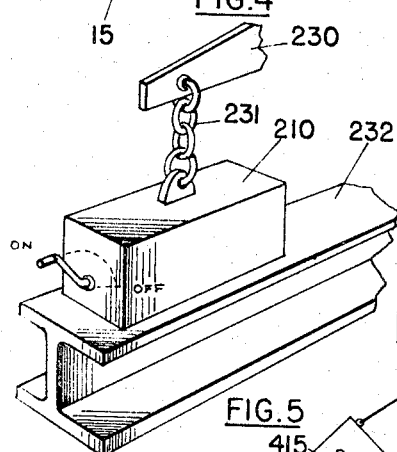
FIG. 5 shows the lifting magnet supporting an I-beam.

FIG. 5 shows a similar magnet device 210, similar to that shown in the other embodiments, is shown supported on a boom 230 by means of a chain 231 so that the magnet can be used to lift iron devices, such as the I-beam 232.

Figure 6:
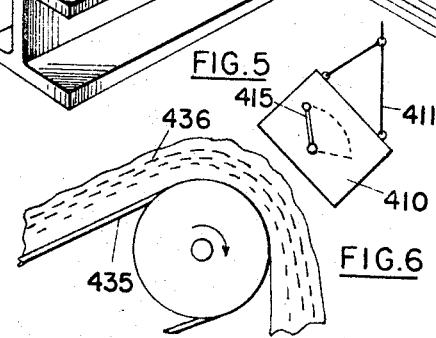
FIG. 6 shows the magnet shown according to the invention utilized as a magnetic separator.

The embodiments of the invention shown in FIG. 6 show a device 410 similar magnetically to FIGS. 1 and 2 supported on a hanger 411 and supported adjacent a belt 435 carrying material 436 from which magnetic particles are to be removed from nonmagnetic. Thus, when the material 436 flows past the magnetic device 410, the magnetic particles are removed from the nonmagnetic by the device 410. The crank 415 may be rotated from one position to another to turn the magnet off enabling removal of the particles attracted to the device 410.

Figure 7:
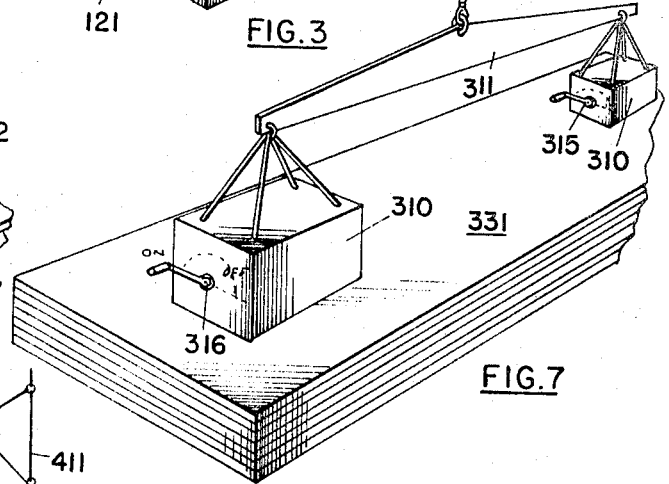
FIG. 7 shows the magnet according to the invention utilized for lifting sheet steel.

The embodiment of FIG. 7 shows the magnet 310 attached to an equalizing bar 311, which may be used to support single or stacks of steel sheets 331. The cranks 315 and 316 may be used to turn the magnets on and off to attach to the steel sheets 331. Cranks 315 and 316 may be stopped at intermediate positions to adjust the magnetic strength for lifing single sheets from the stack of sheets 331.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A magnet device comprising:
a stator having a first leg and a second leg each made of rectangular plate-like members, spaced from each other and defining a space therebetween, a concave surface formed on the side of each said leg adjacent the other, each said surface defining a cylindrical space, permanent magnetic means sandwiched between said plates of said stator so that said first leg has a north magnetic polarity only and said second leg has a south magnetic polarity only providing a magnetic field between said legs, said concave surfaces being spaced from said magnetic means, an armature having a first convex end and a second convex end, means rotatably supporting said armature in said space between said legs with said convex ends of said armature received in said space defined by said concave surfaces, said legs extending outward beyond said armature, permanent magnetic means magnetizing said armature so that said first end has a north magnetic polarity only and said second end has a south magnetic polarity only, means to rotate said armature about an axis coincident with the axis of said cylindrical space to a position where said first end of said armature is adjacent said first leg and whereby said fields between said legs are in aiding relationship with said field of said armature, said means to rotate said armature also being adapted to rotate said armature to a position at which said south pole of said armature is adjacent said north pole of said stator whereby said field from said first leg to said second leg passes through said armature.

2. The magnet device recited in claim 1 wherein said means rotatably supporting said armature comprises bearings on said stator and shaft means on said armature,
said shaft means engaging said bearing means and thereby rotatably supporting said armature on said stator.

3. The device recited in claim 1 wherein said permanent magnet of said stator is made up of a plurality of ceramic magnet blocks disposed in a stack.

4. The device recited in claim 1 wherein said magnet of said rotor is made up of a plurality of ceramic magnet blocks disposed in a stack.

5. The device recited in claim 3 wherein said magnet blocks are generally rectangular in shape.

6. The device recited in claim 1 wherein said shaft has a crank thereon.

7. The device recited in claim 6 wherein said stator is disposed in a nonmagnetic case with said legs terminating adjacent one side of said case.

References Cited

UNITED STATES PATENTS

| | | | |
|---|---|---|---|
| 2,435,735 | 2/1948 | Briggs | 335—285 |
| 2,972,485 | 2/1961 | Ferchland | 335—288 XR |
| 3,164,756 | 1/1965 | Steingroever | 335—302 |
| 3,184,654 | 5/1965 | Bey | 335—302 XR |
| 3,223,898 | 12/1965 | Bey | 335—306 XR |

BERNARD A. GILHEANY, *Primary Examiner.*

D. M. MORGAN, *Assistant Examiner.*

U.S. Cl. X.R.

335—295